US012197881B2

(12) United States Patent
Cui et al.

(10) Patent No.: US 12,197,881 B2
(45) Date of Patent: Jan. 14, 2025

(54) TEXT TO VISUALIZATION

(71) Applicant: Microsoft Technology Licensing, LLC, Redmond, WA (US)

(72) Inventors: Weiwei Cui, Redmond, WA (US); He Huang, Beijing (CN); Haidong Zhang, Beijing (CN); Daniel Cheung, Mountain View, CA (US); Bei Chen, Redmond, WA (US); Ishita Gupta, Redmond, WA (US); Yu Mao, Bellevue, WA (US); Jian-Guang Lou, Redmond, WA (US); Dongmei Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 504 days.

(21) Appl. No.: 17/266,924

(22) PCT Filed: Jun. 20, 2019

(86) PCT No.: PCT/US2019/038085
§ 371 (c)(1),
(2) Date: Feb. 8, 2021

(87) PCT Pub. No.: WO2020/050894
PCT Pub. Date: Mar. 12, 2020

(65) Prior Publication Data
US 2021/0350090 A1    Nov. 11, 2021

(30) Foreign Application Priority Data
Sep. 6, 2018    (CN) .......................... 201811039339.7

(51) Int. Cl.
*G06F 40/58* (2020.01)

(52) U.S. Cl.
CPC ................................... *G06F 40/58* (2020.01)

(58) Field of Classification Search
CPC ........ G06F 40/58; G06F 40/30; G06F 40/103; G06Q 10/10
(Continued)

(56) References Cited

U.S. PATENT DOCUMENTS 9,633,048 B1 * 4/2017 Dutta .................... G06F 16/587
2010/0070448 A1 * 3/2010 Omoigui ............. H01L 27/1463
706/55
(Continued)

FOREIGN PATENT DOCUMENTS

CN    101546587 A    9/2009
CN    108140018 A    6/2018
(Continued)

OTHER PUBLICATIONS

"Data-Driven Documents", Retrieved from: https://d3js.org/, Retrieved Date: Feb. 23, 2021, 4 Pages.
(Continued)

*Primary Examiner* — Pierre Louis Desir
*Assistant Examiner* — Fouzia Hye Solaiman
(74) *Attorney, Agent, or Firm* — Schwegman Lundberg & Woessner, P.A.

(57) ABSTRACT

Various implementations of the present disclosure relate to text to visualization. In a method, information items are extracted from a natural language sentence. Visual elements associated with the information items are determined. A visual representation of the natural language sentence based on the visual elements is determined, the visual representation indicating information expressed by the natural language sentence.

20 Claims, 4 Drawing Sheets

(58) Field of Classification Search
USPC .......................................................... 704/2
See application file for complete search history.

(56) References Cited

U.S. PATENT DOCUMENTS

| | | | | |
|---|---|---|---|---|
| 2013/0097177 A1* | 4/2013 | Fan | ...................... | G06F 16/438 707/805 |
| 2013/0238316 A1* | 9/2013 | Shastri | .................... | G06F 40/10 704/9 |
| 2019/0103111 A1* | 4/2019 | Tiwari | ................ | G06F 16/3329 |
| 2020/0066261 A1* | 2/2020 | Ganz | ....................... | G06F 40/30 |

FOREIGN PATENT DOCUMENTS

| | | | | |
|---|---|---|---|---|
| CN | 201811039339.7 | | 9/2018 | |
| WO | WO-2015038408 A2 * | | 3/2015 | ............ G06F 17/211 |
| WO | PCT/US2019/038085 | | 6/2019 | |
| WO | WO-2020005616 A1 * | | 1/2020 | ........... G06F 16/345 |

OTHER PUBLICATIONS

"Vega—A Visualization Grammar", Retrieved from: https://vega.github.io/vega/, Feb. 18, 2021, 1 Page.

Bui, et al., "Automated Illustration of Patients Instructions", In the Annual Symposium Proceeding of American Medical Informatics Association, Nov. 3, 2012, pp. 1158-1167.

Cui, et al., "Text-to-Viz: Automatic Generation of Infographics from Proportion-Related Natural Language Statements", In The Repository of arXiv:1907.09091v1, Jul. 22, 2019, 11 Pages.

Huang, "Infographic Designer", Retrieved from: https://www.microsoft.com/en-us/research/project/infonice/, Aug. 29, 2018, 5 Pages.

Kim, et al., "Data-Driven Guides", Retrieved from: http://www.zcliu.org/ddg/, Retrieved date: Sep. 16, 2016, 1 Page.

Kirk, Andy, "Adobe Sneak Peak: Project Lincoln", Retrieved from: https://www.visualisingdata.com/2017/10/adobe-sneak-peak-project-lincoln/, Oct. 24, 2017, 2 Pages.

"International Search Report and Written Opinion Issued in PCT Application No. PCT/US19/038085", Mailed Date: Aug. 6, 2019, 11 Pages.

"First Office Action and Search Report Issued in Chinese Patent Application No. 201811039339.7", Mailed Date: Mar. 30, 2023, 14 Pages.

Rejection Decision Received for Chinese Application No. 201811039339.7, mailed on Jan. 4, 2024, 10 pages (English Translation Provided).

* cited by examiner

TEXT TO VISUALIZATION

CROSS-REFERENCE TO RELATED APPLICATION

This application is a U.S. National Stage Filing under 35 U.S.C. 371 of International Patent Application Serial No. PCT/US2019/038085, filed Jun. 20, 2019, and published as WO 2020/050894 A1 on Mar. 12, 2020, which claims priority to Chinese Application No. 201811039339.7, filed Sep. 6, 2018, which applications and publication are incorporated herein by reference in their entirety.

BACKGROUND

Generally, a visual representation (for example, a chart, graph, pattern or the like) for information draws attention quickly, and can present a great deal of information. Compared to information in the form of text or the like, visualization can help people in processing or understanding information. However, it is often difficult to obtain a visual representation, which is time-consuming and requires learning of special skills. Some existing visualization solutions can be implemented only by those technicians with certain skills, resulting in a high learning cost.

SUMMARY

Implementations of the present disclosure provide a solution for text visualization. In some implementations, a plurality of information items are extracted from a natural language sentence. A plurality of visual elements associated with the plurality of information items are determined. A visual representation of the natural language sentence is determined based on the plurality of visual elements, the visual representation indicating information expressed by the natural language sentence.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION OF EMBODIMENTS

Figure 1:
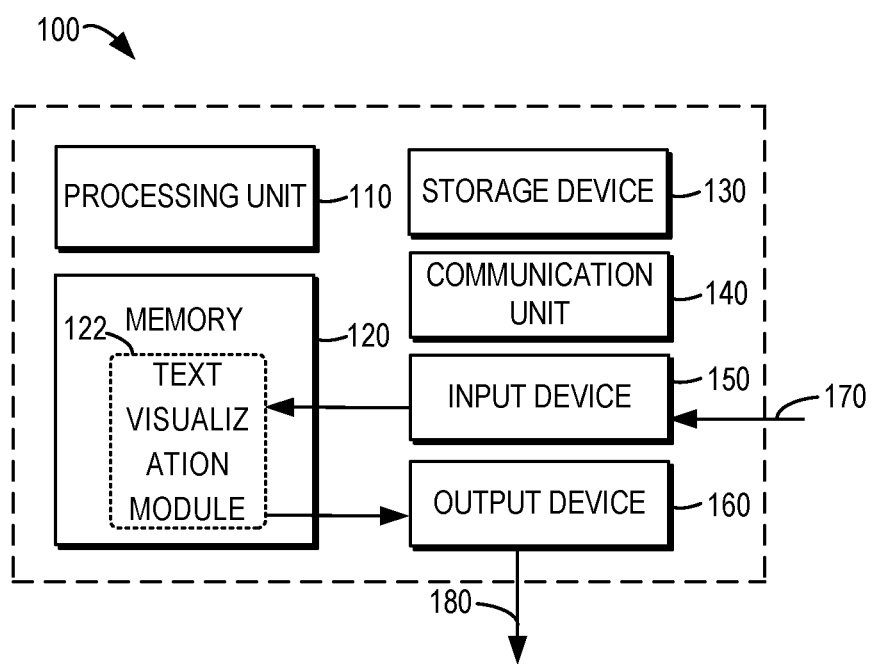
FIG. 1 is a block diagram illustrating a computing device for implementing various implementations of the present disclosure.

Principles of example embodiments disclosed herein will now be described with reference to various example embodiments illustrated in the drawings. It should be appreciated that description of those embodiments is merely to enable those skilled in the art to better understand and further implement example embodiments disclosed herein and is not intended for limiting the scope disclosed herein in any manner.

As used herein, the term "includes" and its variants are to be read as open-ended terms that mean "includes, but is not limited to." The term "based on" is to be read as "based at least in part on." The term "one example embodiment" and "an embodiment" are to be read as "at least one example embodiment." The term "another embodiment" is to be read as "at least one other embodiment." The terms "first," "second," and the like may refer to different or same objects. Other definitions, explicit and implicit, may be included below.

Basic principles and various example implementations of the present disclosure will now be described with reference to the drawings. FIG. 1 is a block diagram illustrating a computing device 100 for implementing various implementations of the present disclosure. It would be appreciated that the computing device 100 described in FIG. 1 is merely provided as an example, rather than constituting any limitation to the functionalities and scope of implementations of the present disclosure. As shown in FIG. 1, the computing device 100 includes a computing device 100 in the form of general computing device. Components of the computing device 100 can include, but are not limited to, one or more processors or processing units 110, a memory 120, a storage device 130, one or more communication units 140, one or more input devices 150, and one or more output devices 160.

In some implementations, the computing device 100 can be implemented as various user terminals or service terminals having a computing capability. The service terminal may be any server, large-scale computing device, and the like, as provided by various service providers. The user terminal, for example, may be any type of mobile terminal, fixed terminal or portable terminal, such as mobile telephone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, TV receiver, radio broadcast receiver, E-book device, gaming device or any combinations thereof, including accessories and peripherals of these devices or any combinations thereof. It would be appreciated that the computing device 100 can support any type of interface for a user (such as a "wearable" circuit).

The processing unit 110 can be any physical or virtual processor and can perform various processing based on programs stored in the memory 120. In a multi-processor system, multiple processing units execute computer-executable instructions in parallel to improve the parallel processing capacity of the computing device 100. The processing unit 110 can also be referred to as a central processing unit (CPU), microprocessor, controller or microcontroller.

The computing device 100 typically includes a plurality of computer storage media, which may be any available media accessible by the computing device 100, including, but not limited to, volatile and non-volatile media, and removable and non-removable media. The memory 120 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The memory 120 can include a text-to-visualization module 122, and these program modules are configured to execute functionalities of various implementations as described herein. The text-to-visualization module 122 can be accessed and operated by the processing unit, so as to implement respective functionalities.

The storage device 130 can be any removable or non-removable medium, and can include machine-readable media which can be used for storing information and/or data and accessed in the computing device 100. The computing device 100 can further include additional removable/non-removable, volatile/non-volatile memory media. Although not shown in FIG. 1, a disk drive can be provided for reading and writing a removable and non-volatile disk and a disc drive can be provided for reading and writing a removable non-volatile disc. In these cases, each drive can be connected to the bus (not shown) via one or more data medium interfaces.

The communication unit 140 communicates with a further computing device via communication media. Additionally, functions of components in the computing device 100 can be implemented by a single computing cluster or multiple computing machines connected communicatively for communication. Therefore, the computing device 100 can be operated in a networking environment using a logical link with one or more other servers, network personal computers (PCs) or another general network node.

The input device 150 can include one or more input devices, such as a mouse, keyboard, tracking ball, voice-input device, and the like. The output device 160 can include one or more output devices, such as a display, loudspeaker, printer and the like. As required, the computing device 100 can also communicate via the communication unit 140 with one or more external devices (not shown) such as a storage device, display device and the like, one or more devices that enable users to interact with the computing device 100, or any devices that enable the computing device 100 to communicate with one or more other computing devices (for example, a network card, modem, and the like). Such communication can be performed via an input/output (I/O) interface (not shown).

In some implementations, besides being integrated on a single device, some or all components in the computing device 100 can be provided in the form of cloud computing architecture. In the cloud computing architecture, these components can be arranged remotely, and can operate together to implement the functionalities described herein. In some implementations, the cloud computing provides computing, software, data access and storage services, and it is unnecessary for a terminal user to know the physical location or configuration of the system or hardware that provides these services. In various implementations, the cloud computing provides services via a wide area network (for example, Internet) using an appropriate protocol. For example, a cloud computing provider provides applications via a wide area network, and they are accessible via a web browser or any other computing component. Software or components and respective data of the cloud computing architecture can be stored on a server at a remote location. Computing resources in a cloud computing environment can be merged at a remote data center location or can be dispersed. Cloud computing infrastructures can provide services through a shared data center even though they are presented as a single access point for the user. Hence, the cloud computing architecture can be used to provide components and functionalities as described herein from the service provider at the remote location. Alternatively, they may be provided from regular servers, or they may be mounted on a client device directly or in other manners.

The computing device 100 can be used to implement a method of transforming a text into its visual representation according to a plurality of implementations of the present disclosure. For example, the method can automatically generate visualization from a text. In some implementations, "visual representation" may be infographics, which is a graphical visual representation of information, data, or knowledge and used to present information rapidly and clearly. When the text is transformed into its visual representation, the computing device 100 can receive, via an input device 150, a text (or natural language statement) 170, for example "More than 40% of the students like football." The computing device 100 can process the text 170, and generate its visual representation based on the text 170. For example, an example of the visual representation shows 10 students, in which 4 students are highlighted, and "40%" is displayed in a large font size and followed by "of the students like football" in a small font size. The visual representation can be provided to the output device 160 and further to a user or the like, as an output 180. For example, the visual representation can be displayed on the display.

Figure 2:
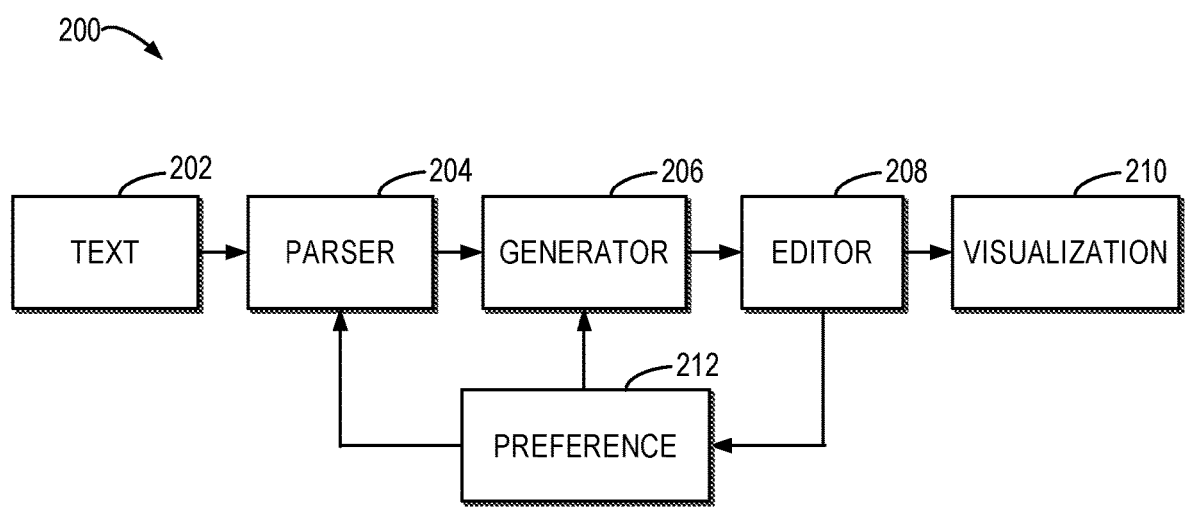
FIG. 2 is a schematic diagram illustrating a text-to-visualization architecture according to some implementations of the present disclosure.

The example implementations of the present disclosure will be described in detail with reference to FIGS. 2-4. FIG. 2 is a schematic diagram illustrating text-to-visualization architecture 200 according to some implementations of the present disclosure. It would be appreciated that FIG. 2 is merely provided for illustration, without suggesting any limitation to the scope of the present disclosure. Without departing from the spirits and scope of the present disclosure, one or more modules of the text-to-visualization architecture 200 may be omitted, and one or more modules may be additionally provided to the text-to-visualization architecture 200, or one or more modules of the text-to-visualization architecture 200 may be replaced.

In some implementations, a text 202 is one or more natural language sentences or statements which may include numerical information. For example, the numerical information may be of a number of different types, such as proportion, quantity, change, rank, multiple, or range. One example of the proportion is "25% of the Americans live below the federal poverty line." One example of the quantity is "there are 1.4 billion students on earth." One example of rank is "most users click the first ranking site on search engines." One example of multiple is "the population of China is four times more than the United States." One example of range is "users usually leave web pages in 10-20 seconds." It would be appreciated that the above sentences are only some examples of the text 202, without suggesting any limitations as to the scope of the present disclosure. Without departing from the spirits and scope of the present disclosure, the text 202 may also be other types of natural language sentences, statements or texts, or even may not include numerical information. The text 202 can be provided in the form of voice, speech, or the like, and obtained in a speech-to-text form.

After the text 202 is provided to the parser 204, the parser 204 can parse the text 202 into a plurality of information items. For example, the parser 204 can divide or segment the text 202 into a plurality of portions, and each portion indicates respective information and corresponds to an information item. For example, for the numerical information of the proportion type, the text 202 can be divided or segmented into four portions (or four information items): "proportion," "whole," "part," and "modifier." In some cases, one or more of "whole," "part," and "modifier" can be omitted. For example, in the text of "More than 40% of the students like football", "40%" is the proportion, "the students" is the whole, "like football" is the part, and "more than" is the modifier.

In some implementations, the parser 204 can determine the type of the numerical information in the text 202, for example, proportion, quantity, rank, range, and so on. For example, this can be implemented with a natural language processing method currently existing or to be developed in the future, and the present disclosure is not limited in the aspect. According to different types of numerical information, the text 202 can be divided or segmented into different numbers and/or different types of portions. For example, according to the numerical information of the quantity type, it may need to divide the text into two portions: "quantity" and "object." For example, the statement "there are 1.4 billion students on earth" may be divided into two portions of "1.4 billion" and "students."

In some implementations, the parser 204 can be implemented by a machine learning based model, such as a neural network model. FIG. 3 is a schematic diagram illustrating a machine learning based parser 204 according to some implementations of the present disclosure. Specifically, the parser 204 as shown in FIG. 3 is a parser based on Named Entity Recognizer (NER). Although FIG. 3 illustrates a parser 204 based on proportion information, it would be appreciated that it is provided as an example only, the parser 204 can also be applied to other types of numerical information or natural language sentences, and the present disclosure is not limited in the aspect. In addition, the architecture of the parser 204 shown in FIG. 3 is merely provided as an example, and the parser 204 can be implemented using any appropriate machine learning architecture currently existing or to be developed in the future. Moreover, although FIG. 3 illustrates a machine learning based parser 204, a rule based parser may also be used to parse the natural language sentence.

Figure 3:
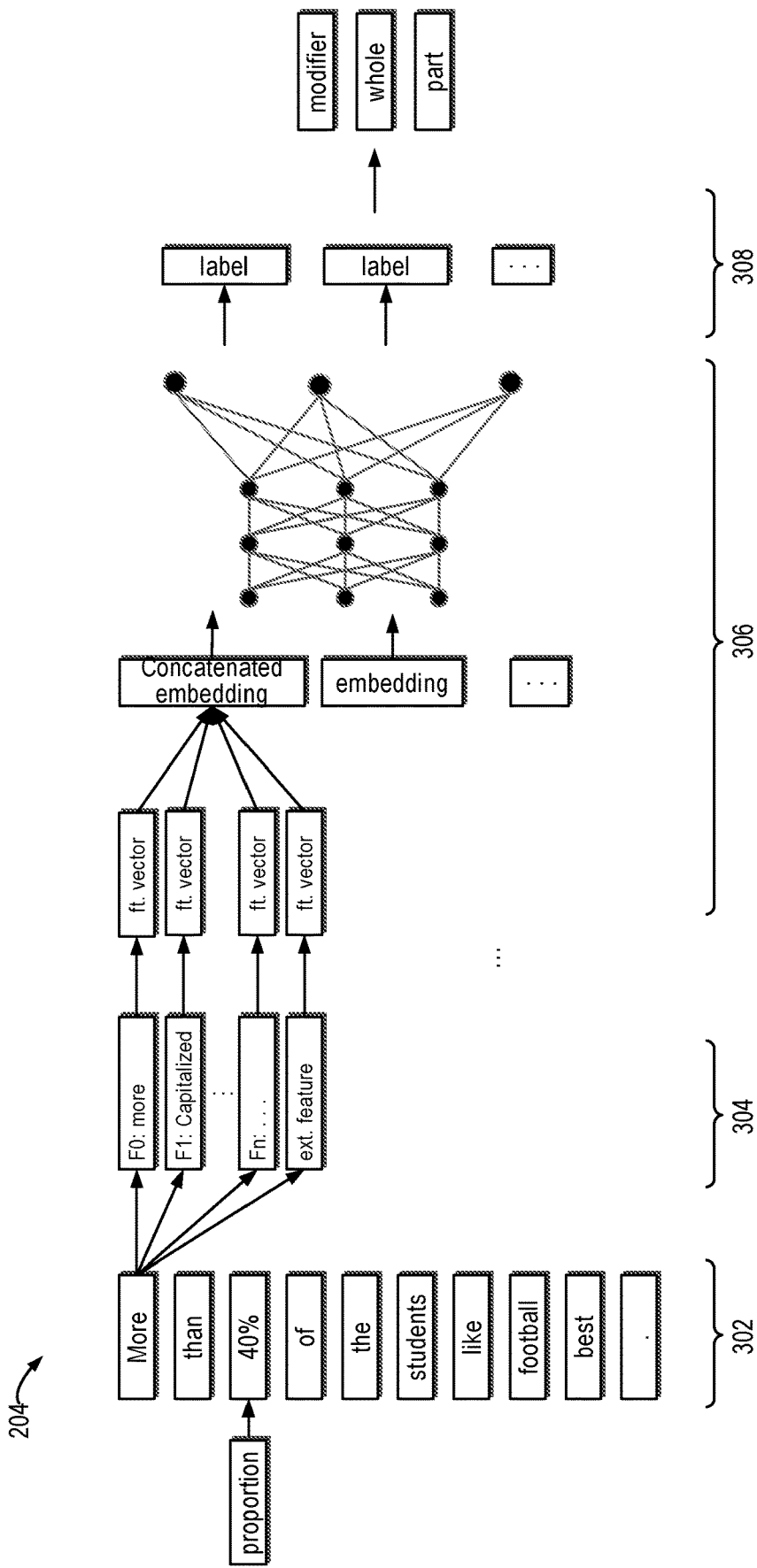
FIG. 3 is a schematic diagram illustrating a parser according to some implementations of the present disclosure.
Figure 4:
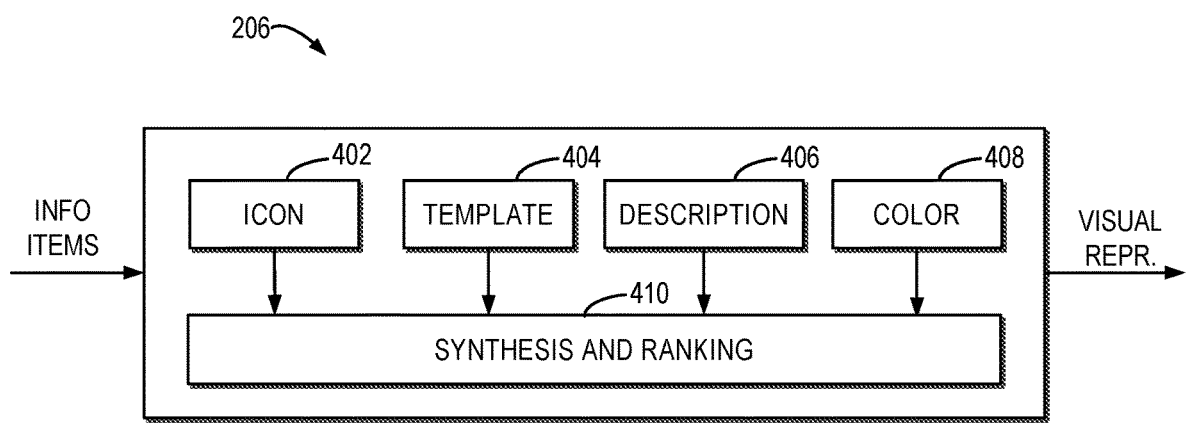
FIG. 4 is a schematic diagram illustrating a generator according to some implementations of the present disclosure.

As shown in FIG. 3, numerical information of proportion or the like can be determined through pattern matching (for example, a regular expression). The recognized numerical information of proportion or the like can act as an external feature. At 302, the natural language sentence is segmented word by word to obtain tokens such as words. At 304, the feature for each token can be extracted as a basic feature, and the extracted basic features are combined with the external features. These features are provided to block 306 where these features are transformed into respective vectors, and the vector for each token is combined into an embedding representation or an embedding. The embedding of each token is provided to a convolutional neural network (CNN). The output of CNN is provided to a conditional random field (CRF) at 308. CRF can determine a label corresponding to each token, and the label can indicate which portion or information item, from "modifier," "whole" and "part" the label corresponds to.

Now returning to FIG. 2, after the parser 204 parses information items from the text 202, the generator 206 generates candidate visual representations of the text 202. The generator 206 can determine visual elements associated with the information items extracted by the parser 204. FIG. 4 is a schematic diagram illustrating the generator 206 according to some implementations of the present disclosure. As shown in FIG. 4, the visual elements may be one or more of an icon 402, a template 404, a description 406, and a color 408.

In some implementations, a visual element library can be constructed for each visual element. For example, various types of icons can be designed or otherwise obtained to construct an icon library. The icon library can include icons which are used as pictograms, containers, backgrounds and so on, and each icon can include an associated descriptive tag for match use. Therefore, one or more icons 402 can be selected from the icon library by matching these information items with the descriptive tags in the icon library.

In some implementations, various types of templates can be designed or otherwise obtained to construct a template library. The template 404 can include a visualization feature indicating numerical information. For example, in an example template, the visualization feature can be in the form of ring map, in which two arcs having different colors are fused to form a circle, and a proportion of one of the two arcs in the circle represents the value thereof. The template library can include general templates for various scenarios and dedicated templates dedicated to particular scenarios.

In some implementations, a color 408 can include an aesthetic feature and a semantic feature. For example, the aesthetic feature can include a background color, a foreground color, an icon color, a text color, highlight, and so on. The semantic feature can include icons and color(s) associated with the semantics represented by the information item. For example, blue indicates ocean, red indicates fire, and so on. Therefore, colors can be ranked based on information items to determine a suitable color. For example, a dominant color can be searched based on a keyword, and suitable secondary or sub colors can then be searched based on the dominant color. For example, if a subject in a text is a taxi, it can be obtained that the dominant color is yellow, and other secondary colors matching the yellow are generated automatically.

In some implementations, a description 406 can be determined based on the information items. For different templates, different versions or lengths of descriptions can be used. For example, for the sentence "50% of our brain is devoted to visual functions," different descriptions can be set based on different templates. For example, in one template, only numerical information 50% is indicated, and thus, it is necessary to display the entirety of "of our brain is devoted to visual functions" as a description. In one template, a brain is displayed, 50% of the brain is highlighted, and only "is devoted to visual functions" can be used as the description. The descriptive words can be displayed in suitable effects including font, size, thickness, italics, and so on.

After the visual elements are determined, the generator 206 can organize the visual elements into different candidate visual representations in different manners, and rank the candidate visual representations. For example, the generator 206 can combine these visual elements to determine the candidate visual representations. In some implementations, a synthesis and ranking module 410 can determine respective scores of the candidate visual representations, and rank the candidate visual representations based on the respective scores of the candidate visual representations. The synthesis and ranking module 410 can select one or more visual representations from the candidate icons based on the ranking of the candidate visual representations.

In some implementations, four visual elements can be arranged and combined. In some other implementations, the compatible problem may also be taken into account. For example, a template needs a background icon, but if none of the selected icons supports acting as the background, the combination is not valid and will be eliminated. Scoring is performed for the remaining valid combinations after elimination.

In some implementations, the score of each visual representation includes one or more of a semantic score, an aesthetic score and an informative score. For example, the semantic score indicates a degree of semantic match between the visual element in the candidate visual representation and the natural language sentence. For example, for an information item "student," the candidate visual representation including the student icon should have a higher semantic score than the visual representation of another candidate icon showing a human.

An aesthetic score indicates a visual quality of a candidate visual representation, for example, whether the left and the right are balanced, whether the blank is reasonable, and so on. An informative score indicates integrity of the information expressed by the natural language sentence being indicated by the visual representation. For example, the visual representation with a single numeral without showing any other information has a low score. These scores can be calculated with a rule-based method, or a learning-based method.

Now returning to FIG. 2, after one or more visual representations are provided to a user, the user can select one of the visual representations and modify the selected visual representation. For example, if unsatisfied with the icon, the user can replace the icon with another one, without affecting other portions of the visualization. The editor 208 can receive the selection and modification of the visual representation by the user, and output the respective visual representations 210. The editor 208 can provide a user's preference 212 to the parser 204 and/or the generator 206, during the user selection and modification process. In the subsequent use process, the parser 204 and/or the generator 206 can perform the respective processes of parsing the text and generating a visual representation based on the user's preference 212.

Figure 5:
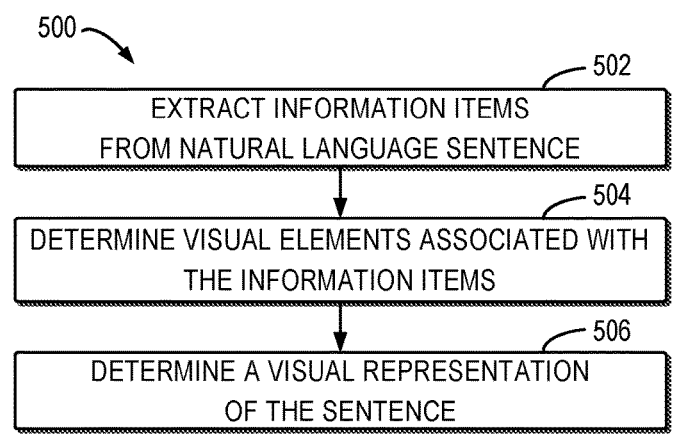
FIG. 5 is a flowchart illustrating a text-to-visualization method according to some implementations of the present disclosure.

FIG. 5 is a flow chart illustrating a text-to-visualization method 500 according to some implementations of the present disclosure. The method 500 can be implemented by the text-to-visualization module 122 as shown FIG. 1.

At 502, a plurality of information items are extracted from a natural language sentence. In some implementation, extracting the plurality of information items includes extracting the plurality of information items from the natural language sentence through a machine learning based model. The machine learning based model can be the parser 204 as shown in FIG. 3.

In some implementations, the natural language sentence includes numerical information, and the visual representation thereof includes an indicator for the numerical information. In some implementations, extracting the plurality of information items includes: determining the numerical information by pattern matching as one of the plurality of information items; and determining other information items of the plurality of information items by a machine learning based model.

In some implementations, extracting the plurality of information items includes: determining a type of the numerical information in the natural language sentence; and segmenting, based on the type of the numerical information, the natural language sentence into a plurality of portions as the plurality of information items At 504, a plurality of visual elements associated with the plurality of information items are determined. In some implementations, determining the plurality of visual elements includes: obtaining at least one of the plurality of visual elements associated with the plurality of information items from a visual element library, the visual element library comprising a plurality of predetermined visual elements. In some implementations, the plurality of visual elements include at least one of an icon, a template, a description and a color.

At 506, the visual representation of the natural language sentence is determined based on the plurality of visual elements, the visual representation indicating information expressed by the natural language sentence. In some implementations, determining the visual representation includes: organizing the plurality of visual elements into a plurality of candidate visual representations in different manners; determining respective scores of the plurality of candidate visual representations; ranking the plurality of candidate visual representations based on the respective scores of the plurality of candidate visual representations; and selecting the visual representation from the plurality of candidate visual representations based on the ranking of the plurality of candidate visual representations.

In some implementations, the score of each candidate visual representation comprises at least one of: a semantic score indicating a degree of semantic match between a visual element in the candidate visual representation and the natural language sentence; an aesthetic score indicating visual quality of the candidate visual representation; and an informative score indicating integrity of information expressed by the natural language sentence being indicated by the candidate visual representation.

Some example implementations of the present disclosure are provided below.

In a first aspect, there is provided a device. The device comprises: a processing unit; a memory coupled to the processing unit and comprising instructions stored thereon, the instructions, when executed by the processing unit, causing the device to perform acts comprising: extracting a plurality of information items from a natural language sentence; determining a plurality of visual elements associated with the plurality of information items; and determining a visual representation of the natural language sentence based on the plurality of visual elements, the visual representation indicating information expressed by the natural language sentence.

In some implementations, extracting the plurality of information items comprises: extracting the plurality of information items from the natural language sentence through a machine learning based model.

In some implementations, the natural language sentence comprises numerical information and the visual representation comprises an indicator for the numerical information.

In some implementations, extracting the plurality of information items comprises: determining the numerical information by pattern matching as one of the plurality of information items; and determining other information items of the plurality of information items by a machine learning based model.

In some implementations, extracting the plurality of information items comprises: determining a type of the numerical information in the natural language sentence; and segmenting, based on the type of the numerical information, the natural language sentence into a plurality of portions as the plurality of information items.

In some implementations, determining the plurality of visual elements comprises: obtaining at least one of the plurality of visual elements associated with the plurality of information items from a visual element library, the visual element library comprising a plurality of predetermined visual elements.

In some implementations, the plurality of visual elements comprise at least one of an icon, a template, a description and a color.

In some implementations, determining the visual representation comprises: organizing the plurality of visual elements into a plurality of candidate visual representations in different manners; determining respective scores of the plurality of candidate visual representations; ranking the plurality of candidate visual representations based on the respective scores of the plurality of candidate visual representations; and selecting the visual representation from the plurality of candidate visual representations based on the ranking of the plurality of candidate visual representations.

In some implementations, the score of each candidate visual representation comprises at least one of: a semantic score indicating a degree of semantic match between a visual element in the candidate visual representation and the natural language sentence; an aesthetic score indicating visual quality of the candidate visual representation; and an informative score indicating integrity of information expressed by the natural language sentence being indicated by the candidate visual representation.

In a second aspect, there is provided a computer-implemented method. The method comprises extracting a plurality of information items from a natural language sentence; determining a plurality of visual elements associated with the plurality of information items; and determining a visual representation of the natural language sentence based on the plurality of visual elements, the visual representation indicating information expressed by the natural language sentence.

In some implementations, extracting the plurality of information items comprises: extracting the plurality of information items from the natural language sentence through a machine learning based model.

In some implementations, the natural language sentence comprises numerical information and the visual representation comprises an indicator for the numerical information.

In some implementations, extracting the plurality of information items comprises: determining the numerical information by pattern matching as one of the plurality of information items; and determining other information items of the plurality of information items by a machine learning based model.

In some implementations, extracting the plurality of information items comprises: determining a type of the numerical information in the natural language sentence; and segmenting, based on the type of the numerical information, the natural language sentence into a plurality of portions as the plurality of information items.

In some implementations, determining the plurality of visual elements comprises: obtaining at least one of the plurality of visual elements associated with the plurality of information items from a visual element library, the visual element library comprising a plurality of predetermined visual elements.

In some implementations, the plurality of visual elements comprise at least one of an icon, a template, a description and a color.

In some implementations, determining the visual representation comprises: organizing the plurality of visual elements into a plurality of candidate visual representations in different manners; determining respective scores of the plurality of candidate visual representations; ranking the plurality of candidate visual representations based on the respective scores of the plurality of candidate visual representations; and selecting the visual representation from the plurality of candidate visual representations based on the ranking of the plurality of candidate visual representations.

In some implementations, the score of each candidate visual representation comprises at least one of: a semantic score indicating a degree of semantic match between a visual element in the candidate visual representation and the natural language sentence; an aesthetic score indicating visual quality of the candidate visual representation; and an informative score indicating integrity of information expressed by the natural language sentence being indicated by the candidate visual representation.

In a third aspect, there is provided a computer program product being tangibly stored in a non-transitory computer storage medium and comprising machine-executable instructions, the machine executable instructions, when executed by a device, causes the device to implement the method according to the second aspect of the present disclosure.

In a fourth aspect, there is provided a computer readable medium comprising computer executable instructions stored thereon, the computer executable instructions, when executed by a device, causing the device to implement the method according to the second aspect of the present disclosure.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A device comprising:
   a processing unit;
   a memory coupled to the processing unit and comprising instructions stored thereon, the instructions, when executed by the processing unit, causing the device to perform acts comprising:
   extracting a plurality of information items from a natural language sentence using a natural language parser, the natural language sentence presented in a user interface;
   determining a plurality of visual elements associated with the plurality of information items;
   altering at least one visual element of the plurality of visual elements based on an information item of the plurality of information items;
   generating a plurality of visual representations of the natural language sentence using various combinations of visual elements from the plurality of visual elements, the plurality of visual representations indicating information expressed by the natural language sentence;
   generating a label for a portion of the natural language sentence corresponding to the at least one visual element;
   generating a description of the portion of the natural language sentence based on an alteration made to the at least one visual element;
   selecting a visual representation from the plurality of visual representations based on at least in part on the description;
   outputting an indication of the visual representation including the description and a selection user interface element to a user; and
   upon receipt of activation of the selection user interface element, updating display of the natural language sentence presented in the user interface using the visual representation including the at least one visual element altered based on the information item.

2. The device of claim 1, wherein extracting the plurality of information items comprises:
   extracting the plurality of information items from the natural language sentence through a machine learning based model.

3. The device of claim 1, wherein the natural language sentence comprises numerical information and the visual representation comprises an indicator for the numerical information.

4. The device of claim 3, wherein extracting the plurality of information items comprises:
   determining the numerical information by pattern matching as one of the plurality of information items; and
   determining other information items of the plurality of information items by a machine learning based model.

5. The device of claim 3, wherein extracting the plurality of information items comprises:
   determining a type of the numerical information in the natural language sentence; and
   segmenting, based on the type of the numerical information, the natural language sentence into a plurality of portions as the plurality of information items.

6. The device of claim 1, wherein determining the plurality of visual elements comprises:
   obtaining at least one of the plurality of visual elements associated with the plurality of information items from a visual element library, the visual element library comprising a plurality of predetermined visual elements.

7. The device of claim 1, wherein the plurality of visual elements comprise at least one of an icon, a template, a description and a color.

8. The device of claim 1, wherein determining the visual representation comprises:
   organizing the plurality of visual elements into a plurality of candidate visual representations in different manners;
   determining respective scores of the plurality of candidate visual representations;
   ranking the plurality of candidate visual representations based on the respective scores of the plurality of candidate visual representations; and
   selecting the visual representation from the plurality of candidate visual representations based on the ranking of the plurality of candidate visual representations.

9. The device of claim 8, wherein the score of each candidate visual representation comprises at least one of:
   a semantic score indicating a degree of semantic match between a visual element in a candidate visual representation and the natural language sentence;
   an aesthetic score indicating visual quality of the candidate visual representation; and
   an informative score indicating integrity of information expressed by the natural language sentence being indicated by the candidate visual representation.

10. A computer-implemented method comprising:
    extracting a plurality of information items from a natural language sentence using a natural language parser, the natural language sentence presented in a user interface;
    determining a plurality of visual elements associated with the plurality of information items;
    altering at least one visual element of the plurality of visual elements based on an information item of the plurality of information items;
    generating a plurality of visual representations of the natural language sentence using various combinations of visual elements from the plurality of visual elements, the plurality of visual representations indicating information expressed by the natural language sentence;

generating a label for a portion of the natural language sentence corresponding to the at least one visual element;

generating a description of the portion of the natural language sentence based on an alteration made to the at least one visual element;

selecting a visual representation from the plurality of visual representations based on at least in part on the description;

outputting an indication of the visual representation including the description and a selection user interface element to a user; and upon receipt of activation of the selection user interface element, updating display of the natural language sentence presented in the user interface using the visual representation including the at least one visual element altered based on the information item.

11. The computer-implemented method of claim 10, wherein extracting the plurality of information items comprises:

extracting the plurality of information items from the natural language sentence through a machine learning based model.

12. The computer-implemented method of claim 10, wherein the natural language sentence comprises numerical information and the visual representation comprises an indicator for the numerical information.

13. The computer-implemented method of claim 12, wherein extracting the plurality of information items comprises:

determining the numerical information by pattern matching as one of the plurality of information items; and determining other information items of the plurality of information items by a machine learning based model.

14. The computer-implemented method of claim 12, wherein extracting the plurality of information items comprises:

determining a type of the numerical information in the natural language sentence; and segmenting, based on the type of the numerical information, the natural language sentence into a plurality of portions as the plurality of information items.

15. The computer-implemented method of claim 10, wherein determining the plurality of visual elements comprises:

obtaining at least one of the plurality of visual elements associated with the plurality of information items from a visual element library, the visual element library comprising a plurality of predetermined visual elements.

16. At least one non-transitory machine-readable medium comprising instructions that, when executed by at least one processor, cause the at least one processor to perform operations to:

extract a plurality of information items from a natural language sentence using a natural language parser, the natural language sentence presented in a user interface;

determine a plurality of visual elements associated with the plurality of information items;

alter at least one visual element of the plurality of visual elements based on an information item of the plurality of information items;

generating a plurality of visual representations of the natural language sentence using various combinations of visual elements from the plurality of visual elements, the plurality of visual representations indicating information expressed by the natural language sentence;

generate a label for a portion of the natural language sentence corresponding to the at least one visual element;

generate a description of the portion of the natural language sentence based on an alteration made to the at least one visual element;

select a visual representation from the plurality of visual representations based on at least in part on the description;

output an indication of the visual representation including the description and a selection user interface element to a user; and upon receipt of activation of the selection user interface element, update display of the natural language sentence presented in the user interface using the visual representation including the at least one visual element altered based on the information item.

17. The at least one non-transitory machine-readable medium of claim 16, wherein the instructions to extract the plurality of information items comprises instructions to:

extract the plurality of information items from the natural language sentence through a machine learning based model.

18. The at least one non-transitory machine-readable medium of claim 16, wherein the natural language sentence comprises numerical information and the visual representation comprises an indicator for the numerical information.

19. The at least one non-transitory machine-readable medium of claim 18, wherein the instructions to extract the plurality of information items comprises instructions to:

determine the numerical information by pattern matching as one of the plurality of information items; and determine other information items of the plurality of information items by a machine learning based model.

20. The at least one non-transitory machine-readable medium of claim 18, wherein the instructions to extract the plurality of information items comprises instructions to:

determine a type of the numerical information in the natural language sentence; and segment, based on the type of the numerical information, the natural language sentence into a plurality of portions as the plurality of information items.

* * * * *